United States Patent

[11] 3,573,486

[72] Inventor John L. Harris
Delafield, Wis.
[21] Appl. No. 850,011
[22] Filed Aug. 14, 1969
[45] Patented Apr. 6, 1971
[73] Assignee Deltrol Corp.
Bellwood, Ill.

[54] CONDITION CONTROL DEVICE AND SYSTEM
14 Claims, 4 Drawing Figs.
[52] U.S. Cl...................................... 307/116,
62/158, 62/231
[51] Int. Cl...................................... H01h 43/12
[50] Field of Search........................... 62/157,
158, 231; 307/116, 117

[56] References Cited
UNITED STATES PATENTS
2,152,250 3/1939 Gay.............................. 62/157(X)

2,730,336 1/1956 Shiers........................... 62/157(X)
3,300,990 1/1967 Jaremus....................... 62/158(X)

Primary Examiner—Robert S. Macon
Assistant Examiner—William J. Smith

ABSTRACT: Protection against refrigeration compressor burnout by short cycling is provided by a timer having an electric motor. This motor is initially energized through a circuit in series with a thermostat and the contactor coil. The motor is then transferred to a circuit shunting the thermostat and then the timer load switch closes energizing the contactor. This shunts the timer motor and stops it. When the thermostat is satisfied, it drops out the contactor and breaks the shunt circuit for the timer motor allowing it to run back to the starting point where the motor is again placed in series with the thermostat. A variable delay is provided by a second timer motor switch which first energizes the motor in parallel with the contactor coil.

INVENTOR.

John L. Harris

CONDITION CONTROL DEVICE AND SYSTEM

This invention relates in general to automatic controls and more particularly to time and temperature control systems for refrigeration compressors.

The primary object of the invention is to provide a simple control system for stopping and starting a compressor and blower motor of a refrigeration system at the command of a condition responsive device and to provide a delay between compressor energizations to protect the compressor against short cycling.

A further object of the invention is to provide a system providing a pressure equalization delay after the compressor stops and before it can be restarted, this delay being timed even though the condition responsive device is not calling for cooling.

Another object of the invention is the provision of a compressor control system which on a normal cycle interposes a pressure equalization delay period before restart of the compressor and which interposes a longer delay in event of a system malfunction.

A further object is the provision of a simple control system in which a timing mechanism performs all of the control functions and eliminates solenoids, relays, etc., required in prior art devices.

Other objects will appear from the following description and appended claims.

For a full disclosure of the invention, reference is made to the following detailed description and to the accompanying drawings in which.

FIGS. 1 AND 2

Figure 1:
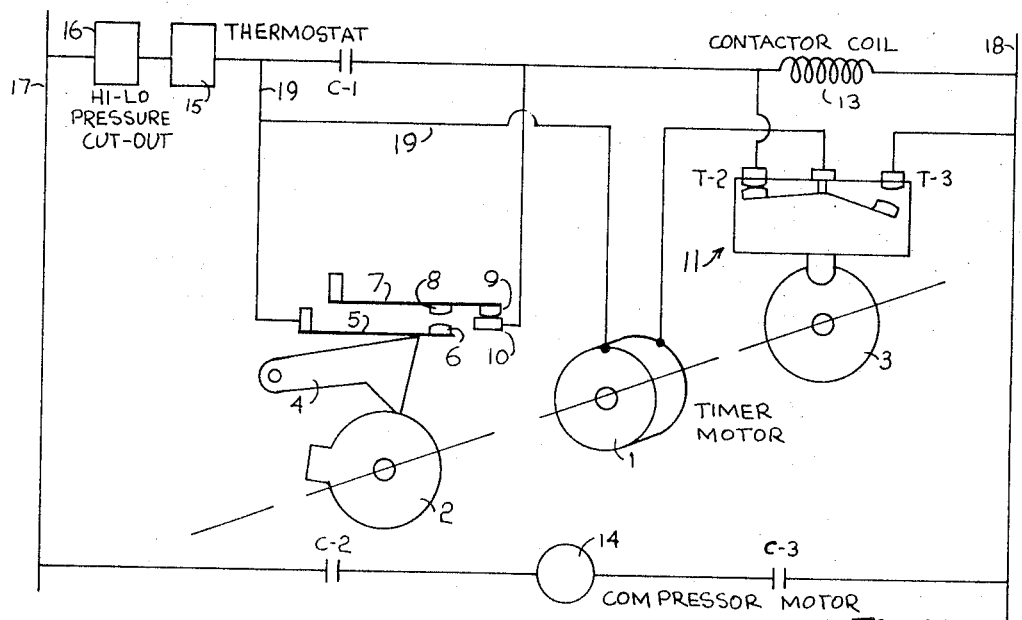
FIG. 1 is a schematic illustration of a refrigerator compressor control system in which the timing means provides a variable delay between compressor restarts depending on the duration of the last cycle.

Referring to FIG. 1, reference character 1 indicates a timer motor driving cams 2 and 3 in a clockwise direction. The cam 2 actuates a cam follower 4 which in turn actuated a switch blade 5 carrying a contact 6. A second switch blade 7 carries a contact 8 cooperating with contact 6 on blade 5. Blade 7 also carries a contact 9 cooperating with a stationary contact 10.

The cam 3 actuates a snap switch 11, having a normally closed contact T-2 and a normally open contact T-3.

The control system also includes a contactor coil 13 having a holding contact C-1 and load contacts C-2 and C-3, controlling the compressor motor 14. The control system also includes an operating control or thermostat 15 and a safety control or high-low pressure cutout 16.

Figure 2:
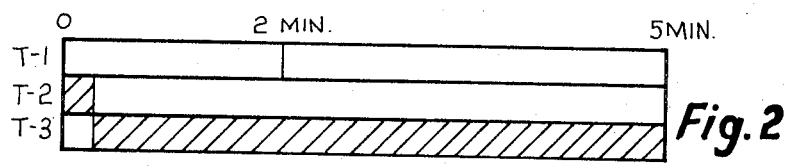
FIG. 2 is a switch operation chart of the embodiment of the invention shown in FIG. 1.

With the parts in the position shown, the system is in the "-standby" position in which the compressor is off and the system is ready to start a new cycle. When the thermostat 15 calls for cooling, it establishes a starting circuit for the timer motor 1 as follows: line wire 17, switches 15 and 16, leads 19, timer motor 1, switch T-2, and contactor coil 13 to line wire 18. The impedance of the timer motor 1 is many times greater than the impedance of the contactor coil 13 and thus the timer motor at this time runs substantially at full voltage and the current draw is insufficient to affect the contactor. A short time after the timer motor 1 starts (as shown in FIG. 2), the cam 3 causes switch 11 to open contact T-2 and close contact T-3. This establishes a circuit for the timer motor 1 independent of contactor coil 13 and direct to the line wire 18. At a predetermined time after starting of the motor 1, such as 2 minutes, the switch T-1 closes momentarily. In this action, the cam follower 4 raises switch blade 5 which engages contact 8. This completes a series circuit through the normally closed contacts 9 and 10 around the contactor holding switch C-1 thus energizing the contactor coil. Contacts C-1, C-2 and C-3 now close. Contact C-1 completes a holding circuit around the timer switch T-1. Contacts C-2 and C-3 energize the compressor motor 14. In a few seconds after contacts 5 and 8 engage, contacts 9 and 10 open, thus opening the timer starting switch T-1. The compressor is now in operation and the timer motor 1 continues to run through contacts T-3 which are now closed. A period of time after switch T-1 closed, the cam follower drops down an abrupt dropoff on the cam 2. This allows contacts 9 and 10 to reengage. However, during the downward motion of blade 5, this blade 5 moves faster than blade 7 and thus contacts 6 and 8 are open when contacts 9 and 10 reengage. Thus the switch T-1 closes only momentarily at one point in the revolution of cam 2. Should the contactor coil 13 be deenergized at any point in the cycle, the holding contact C-1 opens instantly and the timing mechanism must return to the position in which switch T-1 momentarily closes before the compressor can be restarted.

Assuming a normal cycle, the timer will continue operation to complete its revolution from the starting point which may take for example 5 minutes. At this time, the timer cam 3 operates switch 11 to open contacts T-3 and reclose contacts T-2. Closure of the switch T-2 connects the timer motor 1 back in series with the contactor coil 13. However, at this time the timer motor is now shunted by the contactor holding switch C-1 which is closed. The timer motor 1 is therefore deenergized and stops at this point. When the thermostat 15 becomes satisfied it breaks the circuit to the contactor coil 13 opening contacts C-1, C-2 and C-3. The compressor motor stops and the shunt circuit around the timer motor 1 is broken. Thus when the thermostat again calls for cooling, a starting circuit for the timer motor 1 is again provided in series with the contactor coil 13.

From the foregoing, it will be apparent that the embodiment of the invention shown in FIG. 1 provides a variable delay cycle. Following a normal cycle, the delay in starting the compressor after the thermostat calls for cooling will be only 2 minutes. However, if the system should short cycle, for example 15 seconds after starting, the delay would be the balance of the timer cycle, namely 4 minutes 45 seconds. This variable delay is caused by operation of the timer motor for a period of time after the compressor is started by the timer.

FIG. 3

In this embodiment of the invention, the timer motor stops when the compressor is energized and then runs back to the starting position during the normal off period of the compressor.

Timer motor 1a drives cams 2a, 3a and 20 in a clockwise direction. Cam 2a operates a momentary switch T-1 which is of the same construction shown in FIG. 1. Cam 3a operates a snap switch 22 having normally closed contacts T-4 and normally open contacts T-5. Cam 20 operates a snap switch T-6 having normally open contacts controlling the blower motor 21. This blower motor may drive a blower for the evaporator or condenser of the refrigeration system, or both. The timer motor 1a in this embodiment of the invention has one side connected directly to the contactor coil 13a by lead 21. The other side of the timer motor is connected to the common terminal of snap switch 22 and is thus controlled by contacts T-4 and Tc5.

In this embodiment of the invention, no holding switch for the contactor is required. The contactor includes only contacts C-2 and C-3 controlling the compressor motor 14a.

In operation, assuming the limit control switch 16a is closed and the thermostat 15a calls for cooling, a circuit is established to the timer motor from the line wire 17a, limit control 16a, thermostat 15a, lead 25, switch T-4, lead 24, timer motor 1a, lead 23 and contactor coil 13a to wire 18a. This timer motor 1a thus starts revolving cams 2a, 3a and 20 in a clockwise direction. As shown in the chart FIG. 5, the switch T-4 opens and switch T-5 closes in approximately 10 seconds. This establishes a new circuit to the timer motor from line 17a through lead 26, this circuit shunting out the limit control switch 16a and the thermostat switch 15a. In approximately 15 seconds from start, timer switch T-6 closes which places blower motor 21 in operation. Approximately 20 seconds from start, the switch T-1 closes which energizes the contactor coil assuming that the thermostat switch 15a and limit control switch 16a are still closed at this time. The contactor coil 13a on being energized, closes compressor contacts C-2 and C-3 starting the compressor motor. Closure of momentary switch T-1 also establishes a shunt circuit for the timer motor through limit control 16a, thermostat 15a and timer switch T-1. This causes the timer motor to stop with the switch T-1 closed.

The system will operate with the timer motor off, the compressor motor on and the blower motor on until either the thermostat 15a becomes satisfied or the limit control switch 16a indicates an unfavorable condition in the system. If either occurs, the shunt circuit for the timer motor 1a is broken and the contactor coil 13a is deenergized stopping the compressor motor 14a. The timer motor 1a begins running and in a second or two reopens the switch T-1. Reopening of switch T-1 maintains the shunt circuit for the timer motor open and also prevents reenergization of the contactor coil 13a until the timing mechanism has completed a full cycle and returns to the point where switch T-1 is reclosed.

A predetermined time after the timer motor resumes operation, switch T-6 opens which stops the blower motor. The timer motor will continue to be energized in circuit with switch T-5 and the contactor coil until the end of the 5-minute cycle at which time switch T-5 opens and switch T-4 recloses. This stops the timer motor until switches 15a and 16a are both closed for starting a new cooling cycle.

From the foregoing it will be apparent that in this embodiment of the invention, the thermostat on call for cooling places the timer motor in operation in series with the contactor coil. First a maintaining circuit is established for the timer motor through switch T-5. Then momentary switch T-1 closes which starts the compressor and shunts the timer motor thus stopping the motor. This shunt circuit is broken by opening of either the thermostat or limit control switch which stops the compressor and simultaneously starts the timer motor. This will run the timing mechanism back to the standby position during the off period of the compressor. In addition, this embodiment of the invention provides for having the blower motor on before the compressor is started and maintaining it on for a short period after the compressor is stopped. In this embodiment of the invention the delay imposed between stopping and restarting of the compressor is a predetermined constant time no matter how long the operating cycle or what caused the compressor to stop.

FIG. 4

Figure 3:
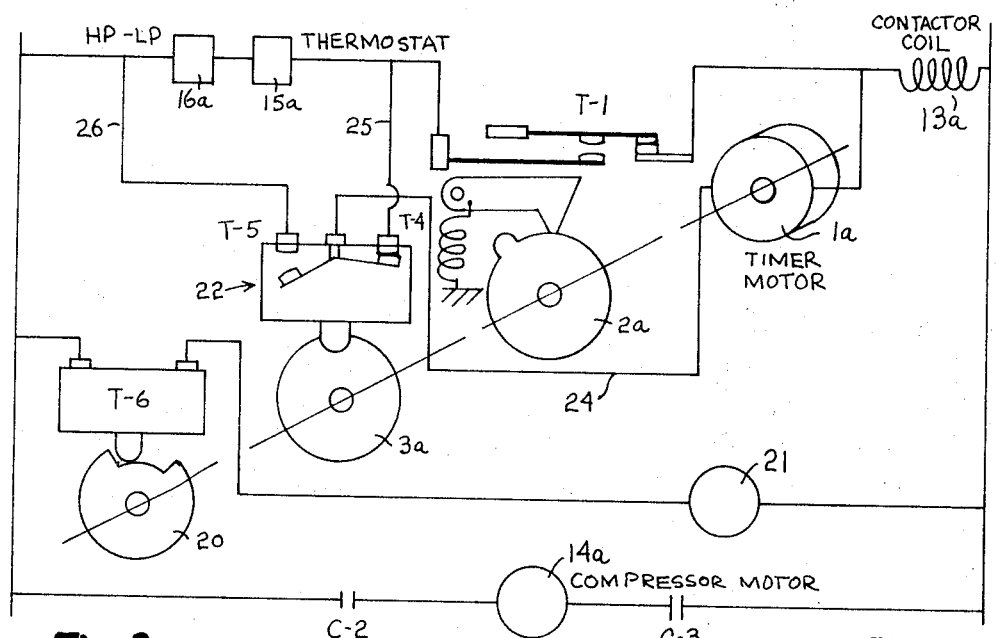
FIG. 3 is a schematic illustration of the system providing a fixed minimum timed interval between stopping and restarting of the compressor and also providing blower control.
Figure 4:
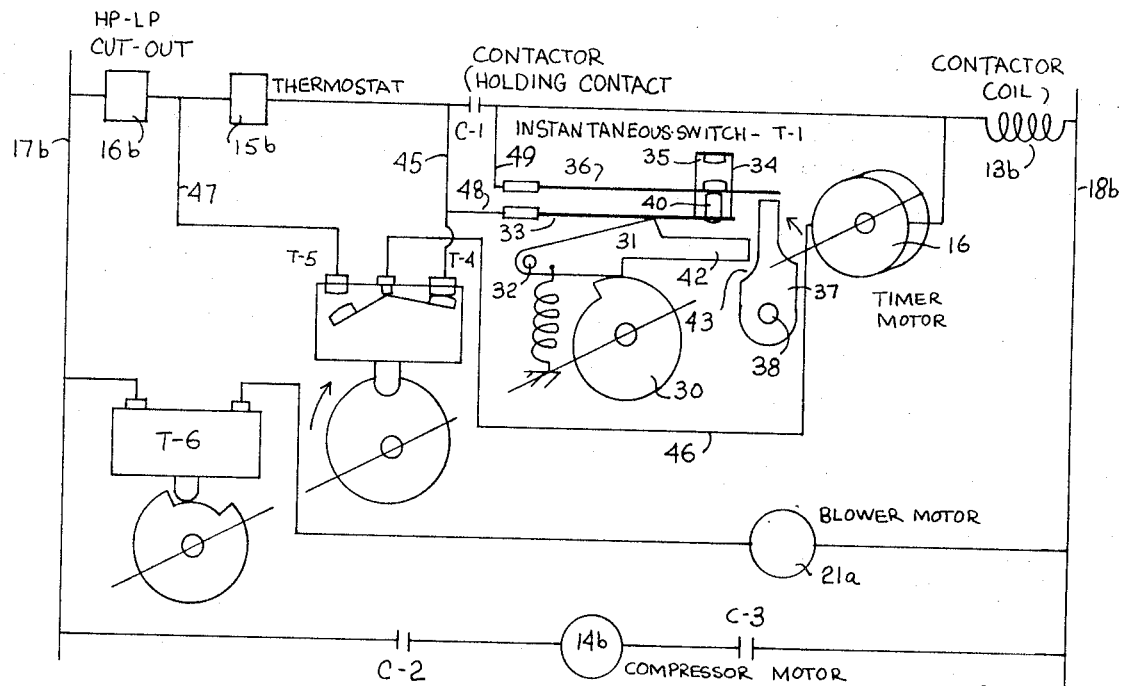
FIG. 4 shows a modification of the general arrangement shown in FIG. 3, but which provides an additional delay in restart if the stoppage is from the limit control, the additional delay period depending upon how long the limit control switch is open.

The embodiment of the invention shown in FIG. 4 is generally the same as shown in FIG. 3. However, this embodiment adds an extra period of time to the delay in restart of the compressor, if stopping is due to opening of the limit control switch. The extra delay added is the length of time the limit control switch is open. In this embodiment of the invention, the instantaneous switch T-1 is closed by action of the timer but opens independently of motion from the timer motor. The cam 30 is of the uniform rise type having a sharp dropoff and operates a cam follower 31 which is pivoted at 32. This cam follower operates a switch blade 33 which is formed with a bracket 34 carrying a downwardly facing contact 35. This contact cooperates with an upwardly facing contact on switch blade 36 having an end portion extending over the latch 37 which is pivoted at 38 and biased in a counterclockwise direction by a spring not shown. An insulating button 40 is carried by the switch blade 33 and serves to raise switch blade 36 along with blade 33 with the contacts separated. In operation the cam 30 raises cam follower 31 which in turn raises blades 33 and 36 to their upper positions as shown. Here the contacts are disengaged and the latch 37 has come into place under the end of switch blade 36. When the cam 30 rotates to the point where the cam follower engages the dropoff portion of the cam, the cam follower moves downwardly with snap action. Switch blade 36 is held by latch 37 while switch blade 33 drops with the cam follower 31 causing the contacts to engage. On continued downward movement of the follower 31, its end 42 engages the camming surface 43 on latch 37 causing this latch to be cammed clockwise in releasing direction. This releases latch 37 from the switch blade 36 allowing this blade to drop, reengaging the insulating button on switch blade 33. Thus the contacts disengage. With this arrangement, the timer motor causes the contacts to engage at a predetermined time. However, the contacts are caused to disengage in a definite period of time determined by the time required for cam follower 42 to disengage the latch 37.

Figure 5:
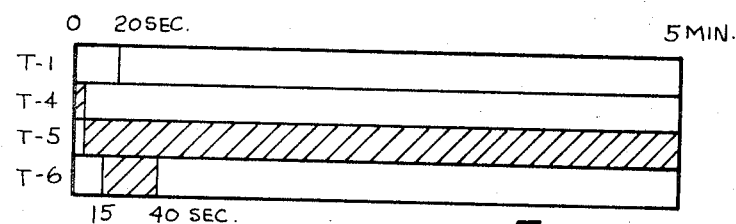
FIG. 5 is a sequence chart applicable to both FIGS. 3 and 4.

In operation, assuming the limit control switch 16b is closed and the thermostat 15b calls for cooling, a starting circuit for the timer motor is established through these switches, lead 45, switch T-4, lead 46, timer motor 1b and contactor coil 13b to line wire 18b. The timer motor is thus energized in series with the contactor coil 13b. The switch operating chart is the same as shown in FIG. 5. Thus in about 10 seconds switch T-4 opens and T-5 closes which establishes a new circuit for the timer motor through lead 47 which shunts out thermostat 15b. The circuit for the timer motor in this case however, is through the limit control switch 16b. In approximately 15 seconds, the switch T-6 closes energizing the blower motor. In approximately 20 seconds switch T-1 closes which energizes the contactor coil 13b through leads 48, 49 and 50. The contactor now pulls in, closing switches C-1, C-2 and C-3. Switch C-1 is a holding switch for the contactor coil 13b maintaining the coil energized in series with the limit control switch 16b and the thermostat switch 15b. Contacts C-2 and C-3 on closing energize the compressor 14b. Switch T-1 in closing creates a shunt circuit for the timer motor thus stopping the motor. This shunt circuit is maintained by closure of the contactor holding contact C-1. Even though the timer motor 1b stopped on closure of switch T-1, this switch reopened by its own mechanism so that a complete revolution of the timer mechanism cam assembly must be made before the compressor can be restarted.

If the compressor operating cycle is terminated normally by the thermostat switch 15b, it will break the circuit for the contactor coil causing the contactor to drop out, opening contacts C-1, C-2 and C-3. This stops the compressor and also breaks the shunt circuit for the timer motor 1b. This motor will now start immediately and drive the timing means back to the standby position, this action occurring during the off period of the compressor.

If the compressor is stopped by opening of the limit control switch 16b, it will drop out the contactor and stop the compressor. Opening of the holding contacts C-1 will break the shunt circuit for the timer motor. However, the timer motor will not operate at this time as its circuit is broken at the switch 16b. The period of time the switch 16b is open is added to the delay time provided by the timing mechanism before the compressor can be restarted. In addition, the timing mechanism remains stationary with the blower motor switch T-6 still closed which ensures operation of the blower motor during the entire time that the limit control switch is open.

This helps alleviate the condition causing the limit control switch to open.

Figure 6:
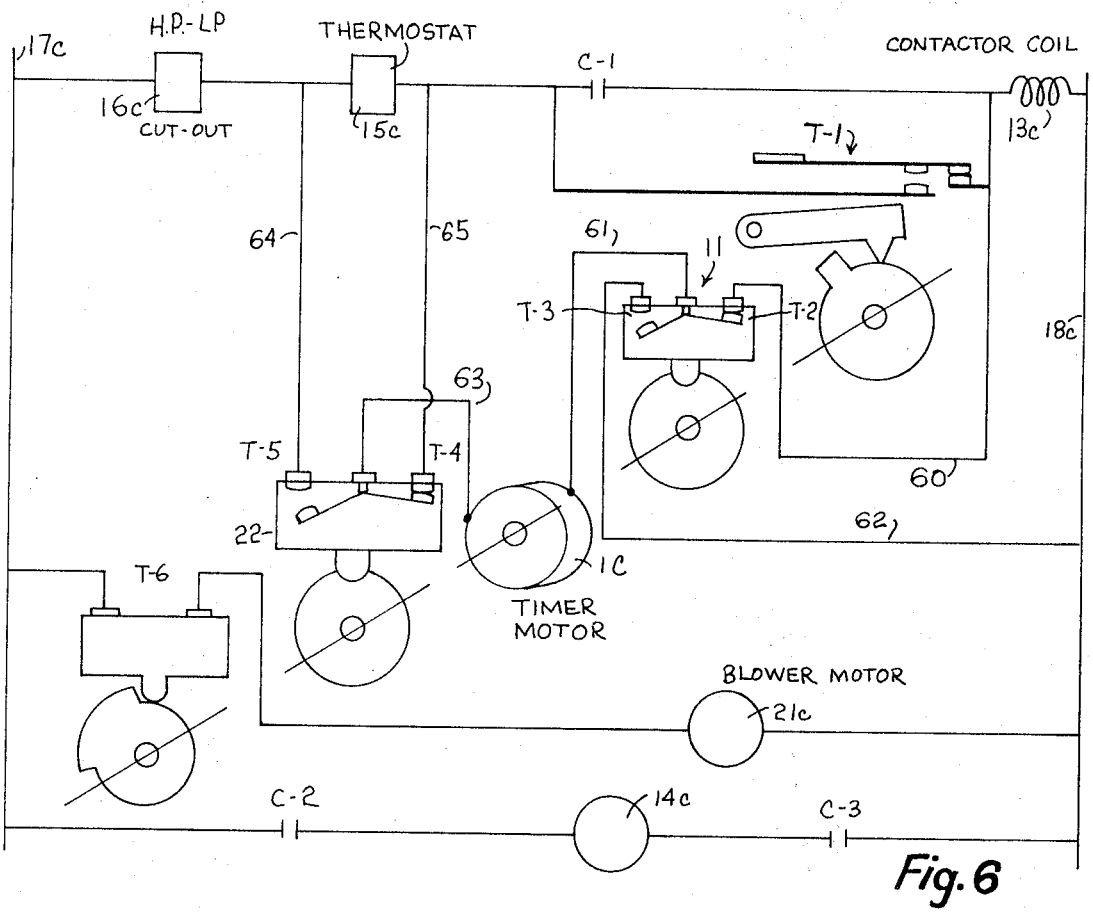
FIG. 6 shows schematically a system providing a minimum delay between a normal stop and restart of the compressor sufficient to provide pressure equalization, and in which the delay is increased a variable amount if the compressor stops on a short cycle.
Figure 7:
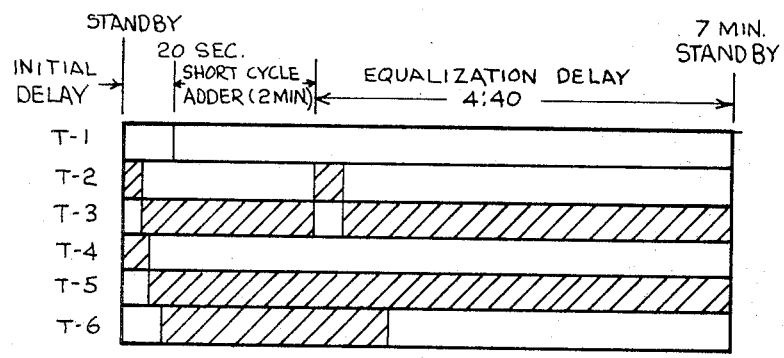
FIG. 7 is a switch operating chart illustrating the operation of FIG. 6.

FIGS. 6 and 7

In this embodiment of the invention, the timing mechanism provides a fixed minimum delay time between stopping of the compressor and restart which is sufficient to provide for pressure equalization in the system. This equalization delay time is run during the normal off time of the compressor. This embodiment of the invention also provides an additional delay time in the event of a short cycle. This additional delay time is provided by operating the timer motor for a period of time after the compressor starts. In addition, this embodiment of the invention provides for adding an indeterminate period of time to the delay if the compressor is stopped by the limit control. This is accomplished by preventing the timer from operating when the limit control switch is open. In addition, this embodiment of the invention provides for control of the blower motor and for maintaining the blower motor in operation when the compressor is stopped by the limit control.

The timing mechanism includes timer motor 1c operating cam operated switches T-1, 11, 22 and T-6. Switch T-1 is of the same construction described in detail in connection with FIG. 1. Switch 11 is a double-throw snap switch having a normally closed switch T-2 connected to the contactor coil 13c along with switch T-1 by lead 60. The common terminal of switch 11 is connected to one side of the timer motor 1c by lead 61. Switch 11 also includes a normally open contact T-3 which is connected to line wire 18c by lead 62.

Switch 22 is a double-throw snap switch having a normally closed contact T-4 and a normally open contact T-5. The common terminal of this switch is connected by lead 63 to the other side of the timer motor 1c. Contact T-5 is connected between the limit control 16c and the thermostat 15c by lead 64 and contact T-4 is connected to the other side of the thermostat 15c by lead 65.

In operation, assuming that the limit control switch 16c is closed, the thermostat 15c on call for cooling will establish a starting circuit for the timer motor 1c from line wire 17c as follows: switch 16c, switch 15c, lead 65, switch T-4, lead 63, timer motor 1c, lead 61, switch T-2, lead 60 and contactor coil 13c to line wire 18c. Thus on call for cooling, the thermostat establishes an initial starting circuit for the timer motor in series with the contactor coil 13c. As shown in FIG. 7, shortly after the timing means is started from the standby position, switch T-2 opens and switch T-3 closes. Also, switch T-4 opens and switch T-5 closes. After these switches have operated as described, a new circuit for the timer motor is established which is independent of the thermostat 15c and also independent of the contactor coil 13c. This circuit is as follows: line wire 17c, limit switch 16c, lead 64, contact T-5, lead 63, timer motor 1c, lead 61, switch T-3 and lead 62 to line wire 18c. Approximately 15 seconds from start, the switch T-6 closes, energizing the blower motor. In about 20 seconds from start, the timer switch T-1 closes energizing the contactor coil 13c. This closes the contactor holding switch C-1 and also contactor switches C-2 and C-3 energizing the compressor motor.

The timer motor continues operating for approximately 2 minutes indicated as "Short Cycle Adder" in the chart FIG. 7. At this time, switch T-3 opens and switch T-2 closes. This places the timer motor 1c in series with the contactor coil 13c which is now energized by closure of the contactor holding switch C-1. The timing motor at this time is now shunted by holding switch C-1 and therefore stops at this point.

The system will remain in this condition in which the compressor motor and blower motor are in operation and the timer motor is stationary until the thermostat 15c is satisfied or until the high-low pressure 16c opens circuit. Assuming a normal cycle in which the thermostat becomes satisfied, it opens the circuit through holding switch C-1 to contactor coil 13c and deenergizes this coil causing contactor switches C-1, C-2 and C-3 to open. This stops the compressor. It also breaks the shunt circuit around the timer motor and allows this motor to run in series with the contactor coil 13c. The energizing circuit for the contactor coil is now open and it cannot be reclosed until the timer means runs back to the standby position and starts a new cycle. As shown in the chart FIG. 7, the timer after stopping the compressor, must run through the 4 minute 40 second equalization period plus the 20 second initial delay period before the compressor can restart. Thus a minimum timing of 5 minutes is interposed between the time the compressor stops and can be restarted.

In the event the system short cycles and compressor operation is terminated by the limit control 16c, the timer must operate an additional period before the compressor can be restarted. This additional period added to the regular equalization period amounts to the unused portion of the 2 minute Short Cycle Adder. Thus, if the compressor stops 15 seconds after it starts, an additional 1 minute 45 seconds is added to the normal delay time.

In addition to the additional delay imposed by the timing mechanism, the high-low pressure control 16c imposes another delay due to the fact that it is in circuit with the timer motor 1c. As long as the switch 16c is open, the timer motor cannot be energized and thus this indeterminate period of time is added to the balance of the Short Cycle Adder.

The embodiment of the invention disclosed in FIGS. 6 AND 7 therefore provides a normal equalization delay time between stopping and starting of the compressor, and a substantially longer period of time in case of a short cycle. In addition, this embodiment of the invention also maintains the blower in operation for a substantial period of time after reclosure of the limit control switch, thereby helping alleviate the condition causing the short cycle.

From the foregoing description it will be apparent that the present invention provides a complete time control system for controlling a refrigeration compressor and blower motor and also for interposing delays protecting the compressor from starting under load and from burnouts caused by short cycling. It will also be apparent that these results are obtained by a reasonably simple timing mechanism and without relays or complicated circuitry. While preferred forms of the invention have been shown and described, it is obvious that many modifications may be made without departing from the spirit and scope of the invention.

I claim:

1. In a control system for a refrigeration system having a compressor motor, a contactor for controlling said motor, said contactor having a switch controlling the motor and a coil, a condition responsive means, timing means having an electric timing motor for driving the same, a first timer-operated switching means connected in circuit with the contactor coil for energizing the same to start the compressor motor, a second timer-operated switching means connected to the timing motor, circuit means including the condition responsive means and the second timer switching means for causing operation of the timing motor upon call for a condition change by the condition responsive means, the timing means being arranged to actuate the first switching means a period of time thereafter, the circuit means being arranged to place the timing motor in series with the contactor coil and to complete a shunt circuit for the timing motor for stopping the same at a predetermined position when the contactor coil is energized, and to break the shunt circuit when the contactor coil is deenergized, providing the timing motor a starting circuit in series with the contactor coil.

2. The combination as defined in claim 1 in which the condition responsive means and the first timer switching means in series form part of the shunt circuit for the timing motor, and in which the second timer switching means provides a circuit to immediately restart the timing motor when the shunt circuit is broken, the first switching means being arranged to open a short period of time thereafter to delay restart of the compressor.

3. The combination as defined in claim 1 in which the shunt circuit includes a holding switch operated by the contactor, said holding switch being opened when the contactor coil is deenergized.

4. The combination as set forth in claim 1 in which the first timer switching means includes means independent of the timer motor for reopening said switching means instantly without movement of the timing motor, and in which the shunt circuit is maintained by a holding switch operated by the contactor.

5. The combination as defined in claim 1 in which the second timer switching means is arranged to place the timing motor either in series with or in parallel with the contactor coil.

6. The combination as set forth in claim 1 in which the second timer switching means establishes a shunt circuit for the condition responsive means so that the timing motor is restarted immediately when the contactor coil is deenergized, said second switching means returning the timing motor to control by the condition responsive means at a predetermined position of the timing means.

7. The combination set forth in claim 6 in which a third timer-operated switching means maintains the timing motor in operation for a period of time after the contactor is energized, and then places the timing motor in series with the contactor coil for stopping the timing motor until the contactor coil is deenergized.

8. The combination set forth in claim 6 in which refrigeration system includes a blower and in which a third switching means operated by the timing means controls the blower in a manner to start the blower at least by the time the compressor is started and to maintain the blower in operation for a period of time after the compressor is stopped.

9. The combination as set forth in claim 6 in which a safety controller responsive to an unfavorable condition associated with the refrigeration system is connected to deenergize both the contactor coil and timing motor, whereby the compressor is stopped in response to such unfavorable condition and the timer is prevented from timing as long as the unfavorable condition exists.

10. The combination as set forth in claim 8 in which a safety controller responsive to an unfavorable condition associated with the refrigeration system is connected to deenergize both the contactor coil and the timing motor as long as the unfavorable condition prevails, thus maintaining the blower in operation.

11. In a control system for a refrigeration system having a compressor motor, a contactor for controlling said motor, said contactor having a switch controlling the motor and a coil, means for controlling said contactor coil including a condition responsive means and a timing means having an electric timing motor, the condition responsive means being arranged to cause starting of the compressor motor on call for condition change, and to stop the compressor motor on call for condition change, and to stop the compressor motor when satisfied, and the timing means being arranged to provide a delay between stopping and restarting of the compressor motor, means for stopping the timing means at a first predetermined position in its cycle after the compressor motor is started, said last-named means including timer-operated switching means and circuit means placing the electric timer motor in series with the contactor coil and providing a shunt circuit for the timer motor when the contactor coil is deenergized, means independent of the condition responsive means for completing the energizing circuit to the timer motor when the contactor coil is deenergized causing the timer motor to start driving the timing means from said first predetermined position, and means for stopping said timing means at a second predetermined position.

12. In a control system for a refrigeration system having a compressor motor, a contactor for controlling said motor, said contactor having a switch controlling the motor and a coil, means for controlling said contactor coil including a condition responsive means and a timing means having an electric timing motor, the condition responsive means being arranged to cause starting of the compressor motor on call for condition change, and to stop the compressor motor when satisfied, and the timing means being arranged to provide a delay between stopping and restarting of the compressor motor, means for causing operation of the timing motor and movement of the timing means for a predetermined time after the compressor motor is started for providing a variable delay between stopping and restarting of the compressor motor depending on the length of time the compressor motor operates, said last-named means including circuit means for the timing motor including switching means operated by the timing means at said predetermined time providing a power circuit for the timing motor in series with the contactor coil whereby the timing motor is shunted at said predetermined time if the contactor coil is energized, and the contactor coil provides a portion of an energizing circuit for the timing motor when the contactor coil is deenergized.

13. In a control system for a refrigeration system having a compressor motor, a contactor for controlling said motor, said contactor having a switch controlling the motor and a coil, means for controlling said contactor coil including a condition responsive means and a timing means having an electric timing motor, the condition responsive means being arranged to cause starting of the compressor motor on call for condition change, and to stop the compressor motor when satisfied, and the timing means being arranged to provide a delay between stopping and restarting of the compressor motor, means for causing operation of the timing motor and movement of the timing means for a predetermined time after the compressor is started for providing a variable delay between stopping and restarting of the compressor depending on the length of time the compressor operates, said last-named means including circuit means for the timing motor including switching means for operated by the timing means at said predetermined time providing a power circuit for the timing motor in series with the contactor coil whereby the timing motor is shunted at said predetermined time if the contactor coil is energized, and the contactor coil provides a portion of an energizing circuit for the timing motor when the contactor coil is deenergized, means independent of the condition responsive means for completing the energizing circuit to the timing motor when the contactor coil is deenergized causing the timing motor to start driving the timing means from the position it stopped when shunted, and means for stopping said timing means at a predetermined position.

14. In a control system for a refrigeration system having a compressor motor, a contactor for controlling said motor, said contactor having a switch controlling the motor and a coil, a condition responsive means, timing means having an electric timing motor for driving the same, a first timer-operated switching means connected in circuit with the condition responsive means and the coil, said first timer switching means being arranged to close at a predetermined position of the timing means for energizing the contactor coil under the control of the condition responsive means, said first switching means also being arranged to be reopened by the timing means when it travels a short distance beyond said predetermined point, a second timer-operated switching means, one side of the timer motor being connected to said second switching means and the other side of the timer motor being connected to the contactor coil in a manner causing the contactor coil to form part of a power circuit for the timer motor, the second timer-operated switching means being arranged to connect said one side of the timer motor to the condition responsive means when in a first position and to provide a circuit for the timer motor shunting the condition responsive means when in a second position, said timing means being arranged to actuate said second switching means from its first position to its second position before closure of the first switching means, and to return the second switching means to its first position a period of time after opening of the first switching means.